United States Patent [19]
Ripley

[11] Patent Number: 6,096,214
[45] Date of Patent: Aug. 1, 2000

[54] PROCESS FOR APPLYING ALTERNATING ANAEROBIC CONTACT PROCESSING FOR THE TREATMENT OF WASTEWATER

[75] Inventor: Leonard Eldan Ripley, Fort Worth, Tex.

[73] Assignee: Freese and Nichols, Inc., Fort Worth, Tex.

[21] Appl. No.: 08/982,242

[22] Filed: Dec. 1, 1997

[51] Int. Cl.⁷ ................................................. C02F 3/30
[52] U.S. Cl. ........................ 210/603; 210/605; 210/623; 210/630; 210/903
[58] Field of Search .................. 210/603–605, 210/607, 609, 613, 622, 623, 629–631, 195.1, 255, 903

[56] References Cited

U.S. PATENT DOCUMENTS

| | | | |
|---|---|---|---|
| 1,360,427 | 11/1920 | Maclachlan . | |
| 2,893,957 | 7/1959 | Genter et al. | 210/603 |
| 4,022,665 | 5/1977 | Ghosh et al. | 210/603 |
| 4,067,801 | 1/1978 | Ishida et al. | 210/603 |
| 4,271,026 | 6/1981 | Chen et al. | 210/605 |
| 4,652,374 | 3/1987 | Cohen | 210/603 |
| 4,672,691 | 6/1987 | De Garie et al. | 210/218 |
| 4,925,552 | 5/1990 | Bateson et al. | 210/150 |
| 4,940,540 | 7/1990 | McDowell | 210/150 |
| 4,948,510 | 8/1990 | Todd et al. | 210/605 |
| 5,013,441 | 5/1991 | Goronszy | 210/605 |
| 5,080,793 | 1/1992 | Urlings | 210/603 |
| 5,185,079 | 2/1993 | Dague | 210/603 |
| 5,447,633 | 9/1995 | Matsche et al. | 210/605 |
| 5,505,848 | 4/1996 | Landine et al. | 210/170 |
| 5,514,278 | 5/1996 | Khudenko | 210/605 |
| 5,536,407 | 7/1996 | Petersen | 210/605 |
| 5,599,450 | 2/1997 | Li et al. | 210/603 |
| 5,670,047 | 9/1997 | Burke | 210/603 |

FOREIGN PATENT DOCUMENTS

| | | |
|---|---|---|
| 0071960 | 2/1983 | European Pat. Off. . |
| 0382340 | 8/1990 | European Pat. Off. . |
| 2521975 | 8/1983 | France . |
| 37317030 | 5/1989 | Germany . |
| 380061 | 7/1989 | Germany . |

*Primary Examiner*—Thomas G. Wyse
*Attorney, Agent, or Firm*—Sidley & Austin

[57] ABSTRACT

An alternating anaerobic contact system for treating wastewater through an apparatus including one enclosed vessel partitioned into two or more enclosed chambers wherein each chamber is flow connected to other chambers by conduits or an apparatus including two or more enclosed vessels wherein each vessel is flow connected to other vessels by conduits. Each apparatus comprises at least one conduit which allows for (1) an anaerobic liquor to flow between a pair of chambers or vessels and (2) for treated wastewater to be separated and collected from the anaerobic liquor. Each apparatus overcomes the degassification problems common to anaerobic contact processing by assuring that the partial pressures of each chamber or vessel remain consistent. Each apparatus, furthermore, performs the settling stage of anaerobic contact processing in either a separate chamber or vessel thereby eliminating the need for external tankage, pumps, and piping.

24 Claims, 4 Drawing Sheets

PROCESS FOR APPLYING ALTERNATING ANAEROBIC CONTACT PROCESSING FOR THE TREATMENT OF WASTEWATER

TECHNICAL FIELD OF THE INVENTION

This invention relates to a system applying anaerobic contact processing for the treatment of waste, e.g., wastewater.

BACKGROUND OF THE INVENTION

In general, two categories of biological processes are available for wastewater treatment: aerobic processes and anaerobic processes. Aerobic processes utilize bacteria which require oxygen to convert organic materials primarily to water and carbon dioxide. Anaerobic processes, on the other hand, utilize bacteria which grow in the absence of oxygen and convert organic materials primarily to the end products methane and carbon dioxide. It has been found that for high strength wastewaters, that is wastewaters having a Chemical Oxygen Demand (COD) greater than 2000 mg/L, anaerobic processes are more advantageous because (1) they require less energy and (2) they produce between one-tenth and one-fifth of the residual biomass resulting from aerobic processes.

With respect to the treatment of high strength wastewaters having a Total Suspended Solid (TSS) level greater than 500 mg/L, two categories of anaerobic processes are effective. The first anaerobic process category utilizes anaerobic lagoons which exist as large pits or vessels. With anaerobic lagoons, wastewater is simply introduced into one end of the lagoon whereby suspended anaerobic bacteria within the lagoon degrade both dissolved and particulate organic materials. After an average retention time of several weeks, treated wastewater flows from the anaerobic lagoon.

A second anaerobic process category for wastewater treatment is anaerobic contact processing. Anaerobic contact processes utilize a flow-through, closed top reacting vessel containing anaerobic bacteria. Wastewater flowing into the reacting vessel interacts with the anaerobic bacteria forming an anaerobic liquor. The anaerobic liquor subsequently flows to a settling vessel or clarifier wherein the bacterial solids settle to the bottom of the settling vessel, leaving the relatively clean wastewater to overflow from the top of the settling vessel. Settled solids are then pumped back to the reactor and the process is continued. Before entering the clarifier, the anaerobic liquor passes through a degassifier to minimize the occurrence of super-saturated gases. A typical problem with the anaerobic contact process, however, is achieving good gravity separation of the bacteria from the anaerobic liquor under atmospheric conditions so that only relatively clean wastewater is decanted from the settling vessel.

Several embodiments exist for applying anaerobic processes, a more recent embodiment is the anaerobic sequencing batch reactor (ASBR). An ASBR operates by partially filling a reactor vessel containing anaerobic bacteria with wastewater and gently mixing the contents so to assist the anaerobic bacteria in degrading the organic materials of the wastewater. After the anaerobic bacteria react with the wastewater, the mixer is turned off, allowing the anaerobic bacteria to settle to the bottom of the reactor vessel. The treated wastewater is then decanted from the top of the reactor vessel. Limitations, however, of this anaerobic process are (1) the need for a relatively large feed equalization to accommodate the batch operation and 2) the need to provide a variable-level tank, decanter, and gas collection system.

For wastewaters having a TSS greater than 500 mg/L, lagoons and anaerobic contact processing systems are more effective in treatment. Lagoons, however, require large land space while anaerobic contact systems are subject to settling problems resulting from inadequate degassification or even regassification in the clarifier. An anaerobic contact system is also costly because it requires multiple components: i.e., a separate equalization reactor, a degassifier, outdoor clarifier vessels, associated return pumps, and piping.

The inventor of the invention described herein has developed an apparatus which modifies the conventional application of the anaerobic contact process. Use of this invention precludes the degassification problems occurring in the clarifier device associated with the conventional anaerobic contact process without requiring batch operation or variable-level operation. Additionally, the invention described herein can be manufactured and used at a cost which is much less than that required for an apparatus applying the conventional anaerobic contact process.

SUMMARY OF THE INVENTION

The present invention is directed to an apparatus and method of using the apparatus for treatment of wastewater. With respect to the invention described herein, wastewater is defined as any liquid or semi-liquid comprising organic material. In general, the invention employs the principles of anaerobic contact processing for the removal of contaminants from wastewater. Typical applications of the invention are for treating wastewaters from the grain and food processing industries, biotechnology and pharmaceutical industries, and livestock wastes; but other applications are not precluded.

In one aspect of the invention, a wastewater feed to be treated flows, preferably continuously, into a first vessel (reacting vessel) where it is mixed with anaerobic bacteria, forming an anaerobic liquor. As wastewater continues to flow into the first vessel, a portion of the anaerobic liquor, as a result of the internal pressure of the first vessel, passes into a transfer manifold and flows continuously from the first vessel into a second vessel. Because the mixer of the second vessel is off, the anaerobic bacteria, which are introduced into the second vessel, separate from the anaerobic liquor and settle to the bottom of the second vessel. Treated wastewater rises within the second vessel to a certain level where it passes into an effluent manifold. The treated wastewater then flows, preferably continuously, from the effluent manifold out of the second vessel and into an effluent conduit, where it eventually flows to a municipal wastewater treatment plant or some other like facility.

After an appropriate period of time, wastewater feed-flow into the first vessel is stopped and the mixer in the first vessel is turned off. Additionally at this time, there is no influx or efflux of fluid from either the first or second vessel so that the anaerobic bacteria of the anaerobic liquor in the first vessel separate and settle to the bottom of the first vessel.

With the influent valve of the first vessel closed, the influent valve of the second vessel is opened and the mixer in the second vessel is turned on. The incoming wastewater feed flows, preferably continuously, to the second vessel (the prior settling vessel) and is mixed with the anaerobic bacteria of the concentrated anaerobic liquor which remained in the second vessel. As wastewater feed continues to flow into the second vessel (the new reacting vessel), a portion of the anaerobic liquor, as a result of the internal pressure within the second vessel, passes into a transfer manifold and flows continuously from the second vessel into the first vessel (the new settling vessel). In the first vessel (the new settling vessel), the anaerobic bacteria separate from the anaerobic liquor and settle to the bottom of the first vessel (the new settling vessel). Treated wastewater rises within the first vessel (the new settling vessel) and passes into an effluent manifold. The treated wastewater then flows from the first vessel (the new settling vessel) into the effluent conduit where it eventually flows to a municipal wastewater treatment plant or some other like facility.

Application of the alternating anaerobic contact process can be performed with an apparatus having two or more vessels wherein each pair of vessels in the sequence provide for continuous flow from a current reacting vessel to a current settling vessel. The main aspect of the invention is that as long as there are at least two reacting/settling vessels, the alternating anaerobic contact process can be continuously applied without the requirements of an external clarifier, degassifier or other external piping and pumps between the vessels.

In yet another aspect of the invention, a multi-chambered, single-vessel system can be used wherein each chamber acts as a vessel described above. The alternating anaerobic contact process can be continuously applied between chambers of the single vessel as long as a first chamber serves as a reacting chamber while a second chamber serves as a settling chamber during a first stage of operation, and a chamber other than the first chamber acts as a reacting vessel and a chamber other than the second chamber acts as a settling chamber in a second stage of operation. An advantage of the multi-chambered, single vessel system is that only one vessel is required, thereby reducing the cost of the apparatus.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

While the invention will be described in connection with preferred embodiments, it shall be understood that the invention is not to be limited to any particular embodiment. On the contrary, each embodiment is intended to cover all alternatives, modifications, and equivalents as may be included within the spirit and scope of the invention as defined in the claims. Thus, each specific structural and functional detail described within merely serves as a teaching mechanism for one skilled in the art.

Figure 1:
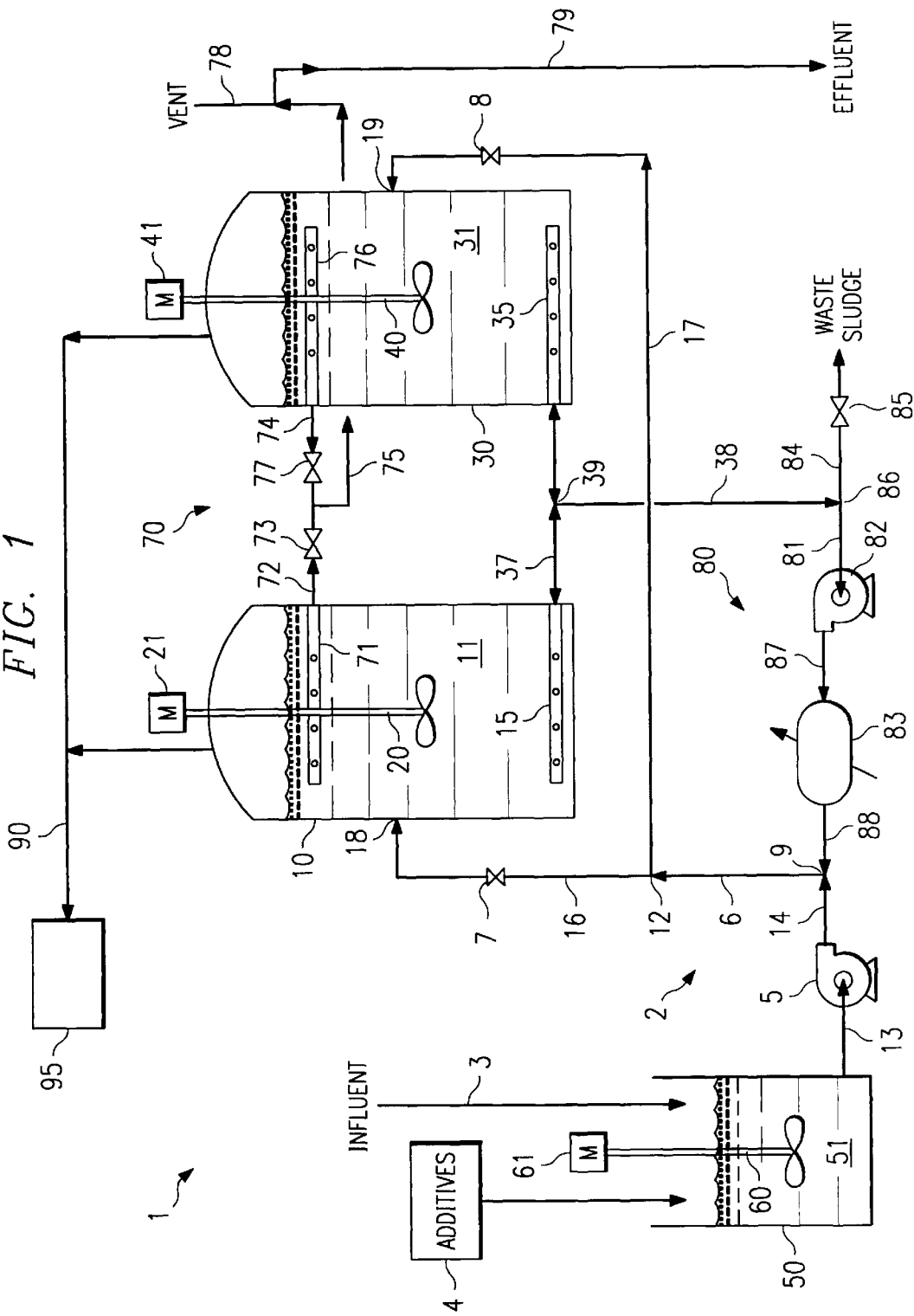
FIG. 1 is a schematical view of a system in accordance with the present invention utilizing an alternating anaerobic contact process.

A first preferred embodiment is illustrated in FIG. 1. The reference numeral 1 represents an apparatus for treating wastewater. Wastewater is defined as any liquid or semi-liquid comprising organic material. In general, the apparatus includes an equalization vessel 50, a feed system 2, a first reacting/settling vessel 10, a second reacting/settling vessel 30, an effluent system 70, and a recycle and waste sludge system 80.

The equalization vessel 50 is flow connected to wastewater feed conduit 3. A wet well or underground vault can also serve as an equalization vessel. Chemical addition system 4 provides additives that mix with the incoming waste in equalization vessel 50. The chemical addition system 4 assists in providing nutrients for anaerobic bacteria, equalizing the pH, and the initial breakdown of waste. Examples of such chemicals are: acids, caustics, nutrients, and flocculants such as polymers. The equalization vessel 50 also includes a mixing system 60 which further assists in waste breakdown. FIG. 1 illustrates a mechanical type mixing system having a motor 61. Alternative mixing systems include the use of liquid recirculation.

The influent system 2 includes a feed conduit 13, feed pump 5, conduit 14, junction 9, conduit 6, junction 12, feed conduits 16 and 17, valves 7 and 8, and connecting nozzles 18 and 19. One end of conduit 13 flow connects to the equalization vessel 50 while the opposite end flow connects with the feed pump 5. Conduit 14 flow connects to the outlet of feed pump 5 and to one end of T-joint 9. A second end of junction 9 attaches to conduit 88 of the recycle system 80. A third end of junction 9 attaches to the conduit 6. The conduit 6 flow connects to junction 12, causing the conduit 6 to bifurcate and form feed conduits 16 and 17. Feed conduit 16, containing valve 7, flow connects to first vessel 10 via nozzle 18. Feed conduit 17, containing valve 8, flow connects to second vessel 30 via nozzle 19.

Reacting/settling vessels 10 and 30 each have a top-wall, a bottom-wall, and a continuous side-wall so as to form an enclosure able to receive wastewater and to contain the liquid contents 11 and 31. Contents 11 and 31 are mainly comprised of a combination of wastewater and anaerobic bacteria and when sufficiently mixed forms an anaerobic liquor. The anaerobic bacteria can be either naturally occurring or genetically-engineered. Mechanical mixing systems 20 and 40, which respectively include motors 21 and 41 are positioned in vessels 10 and 30. Other embodiments for use as a mixing system include biogas and liquid recirculation. The top portion of each of vessels 10 and 30 is flow connected to a gas discharge conduit 90. Gas conduit 90 provides for gas to be removed from both vessels 10 and 30 so that the internal gas pressures of vessels 10 and 30 remain substantially consistent within and between each vessel. The opposite end of gas discharge conduit 90 flow connects into gas handling system 95. A number of gas handling systems can function effectively regarding apparatus 1; however, a common type of gas handling system includes: flame arrestors, a flare, pressure control valves and condensate traps. Near the bottoms of vessels 10 and 30 respectively reside transfer manifolds 15 and 35. A common manifold type includes a horizontal conduit having multiple orifices. Transfer manifolds 15 and 35 flow connect to transfer conduit 37 which extends from manifold 15 in vessel 10 to manifold 35 in vessel 30 via a junction 39 so as to permit continuous flow of anaerobic liquor between vessels 10 and 30.

The effluent system 70 includes effluent manifolds 71 and 76, effluent conduits 72 and 74, effluent valves 73 and 77, effluent trap 75, atmospheric vent 78 and effluent conduit 79. Effluent manifold 71, which is located in the top region of the first vessel 10, is connected to the trap 75 by the conduit 72, containing the valve 73. Similarly, the effluent manifold 76, which is located in the top region of the second vessel 30, is connected to the trap 75 by the conduit 74, containing the valve 77. Effluent trap 75 flow connects to the vent 78 and the effluent conduit 79. Effluent conduit 79 continues beyond apparatus 1. FIG. 1 illustrates effluent trap 75 as flowing around and not through vessel 30. The atmospheric vent 78 can be attached to effluent conduit 79 at any location downstream from the effluent trap 75 to prevent siphoning.

The recycle and waste sludge system 80 includes recycle conduit 81, recycle pump 82, recycle heat exchanger 83, waste sludge conduit 84, valve 85, junction 86, and conduits 87 and 88. Recycle and waste conduit 38 flow connects with recycle conduit 81 and waste sludge conduit 84 at junction 86. Recycle conduit 81 flow connects with the inlet of the recycle pump 82. From the outlet of the recycle pump 82, the conduit 87 flow connects to an inlet of the heat exchanger 83 and conduit 88 flow connects to an outlet of the heat exchanger 83 and to the feed system 2 at the junction 9. Waste sludge conduit 84, containing the valve 85, eventually flow connects to a facility for receiving excess sludge (not shown). Such a recycle and waste sludge system allows excess sludge to be either removed from apparatus 1 or to be recycled for further treatment.

In other preferred embodiments of the invention additional vessels can be added and structured in a similar arrangement to that described above.

In use, apparatus 1 operates essentially as a wastewater treatment process applying the principles of anaerobic contact processing in a multi-vesseled system. Initiation of the process or system begins with the introduction of wastewater from conduit 3 into the equalization vessel 50. In vessel 50 the wastewater is mixed by mixing system 60 while concomitantly being treated by chemical addition system 4. After an appropriate period of time, the wastewater is pumped from the equalization vessel 50 and into conduit 6.

Figure 2A:
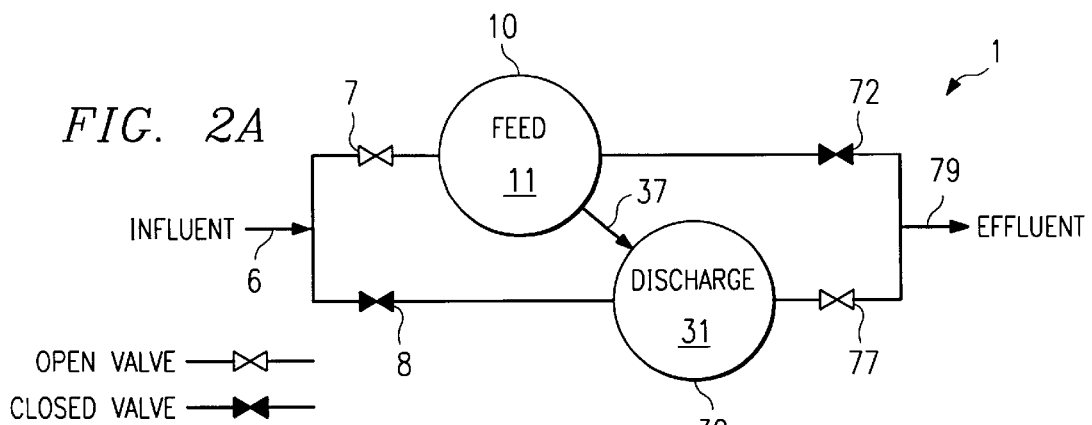
FIGS. 2A, 2B, 2C and 2D are flow schematic diagrams illustrating sequential stages of operation in a modified process when applying the present invention.

FIGS. 2A, 2B, 2C and 2D provide a two-vesseled schemata regarding a preferred application of alternating anaerobic contact processing of waste. FIGS. 2A, 2B, 2C and 2D, however, illustrate only one of the many possible arrangements or steps for performing alternating anaerobic contact processing. FIG. 2A illustrates the first-half of stage one of the process having valve 7 open and valve 8 closed. With this arrangement, vessel 10 receives the incoming wastewater feed and thereby serves as the initial reacting vessel. Mixing system 20 mixes the contents 11 at a rate sufficient to maintain the anaerobic bacteria in suspension without causing the bacteria to shear. The anaerobic bacteria of vessel 10 begin to react and break down the incoming waste. Gases produced during the reaction of the anaerobic bacteria with the organic materials in the contents 11—an anaerobic liquor—are removed from the vessel 10 and introduced into gas conduit 90.

Turning back to FIG. 1, a portion of contents 11 in vessel 10 passes into the transfer manifold 15 at a rate based upon the inflow of wastewater feed to the vessel 10. The orifice size of the transfer manifolds 15 and 35, and the diameter of the transfer conduit 37 are selected so as to promote the desired flow rate through conduit 37 between vessels 10 and 30. A portion of the contents 11 continues to flow at such rate through transfer conduit 37 and into vessel 30 via the transfer manifold 35 to become part of the contents 31. An amount of the portion of contents 11 when in conduit 37 flows into recycle conduit 38 and does not become part of contents 31. The contents 11 in conduit 38 flow into recycle system 80 and are eventually pumped back into conduit 6.

During the first-half of stage one, the vessel 30 acts as the settling vessel for the contents 31, which at this point exists mainly as anaerobic liquor. The anaerobic bacteria along with any organic residual solids separate from the remainder of the contents 31 and settle to the bottom of vessel 30, forming bi-layered contents 31. The top layer exists as treated wastewater while the bottom layer exists as a mixture of wastewater and biomass. As wastewater feed continues to be fed into the vessel 10, fluid passes through conduit 37 into vessel 30 causing a portion of the treated wastewater to pass through effluent manifold 76. The treated wastewater, which passed through effluent manifold 76, passes through open valve 77 and enters effluent conduit 79. The treated wastewater, which flows through conduit 74, has an organic concentration that is substantially less than the organic concentration of the wastewater fed into conduit 13. Effluent conduit 79 can transport the treated wastewater to a municipal wastewater plant or to storage (not shown).

Figure 2B:
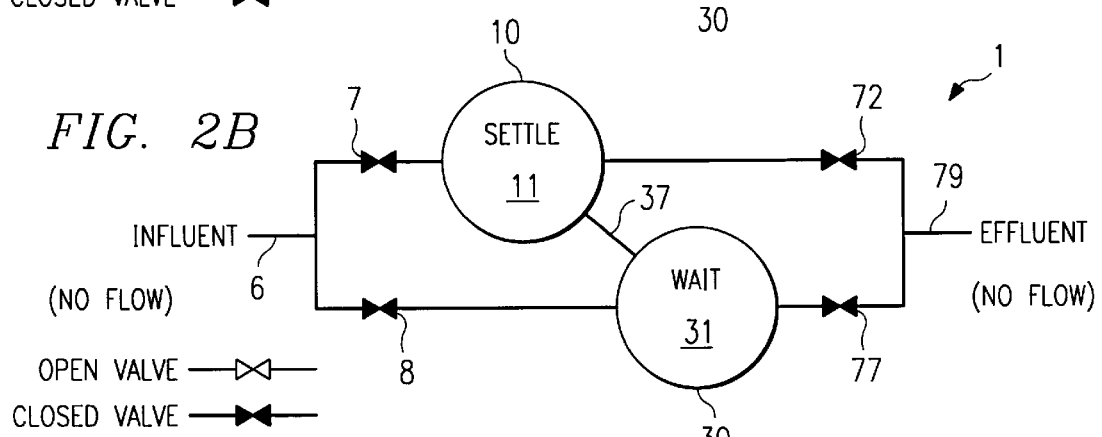

FIG. 2B illustrates the second-half of stage one in the alternating anaerobic contact process. Valves 7 and 77 are closed, thereby discontinuing the flow of wastewater feed into vessel 10 and the flow of treated wastewater from vessel 30. Mixer 20 in vessel 10 is turned to the off position, allowing solids and anaerobic bacteria of contents 11 to settle within vessel 10. Because valves 8 and 72 remain closed, there is no flow within either vessel 10 or vessel 30 other than through transfer conduit 37. As gases are removed, preferably continuously, from both vessels 10 and 30, there is not any significant flow of fluid through conduit 37 during the stage represented by FIG. 2B. In contrast, there is a flow through conduit 37 which is at least substantially continuous and at least substantially equal to the flow rate of feed through conduit 6 during any period of time that either vessel 10 or vessel 30 is being employed to conduct the breakdown of organic material by the anaerobic bacteria. The duration of the second-half of stage one typically lasts for a few hours or until a supernatant layer exists within the contents 11 in vessel 10. Recycle conduit 38 continues to receive an amount of contents 11 flowing through conduit 37 but at a rate less than the rate occurring in the first-half of stage one.

Figure 2C:
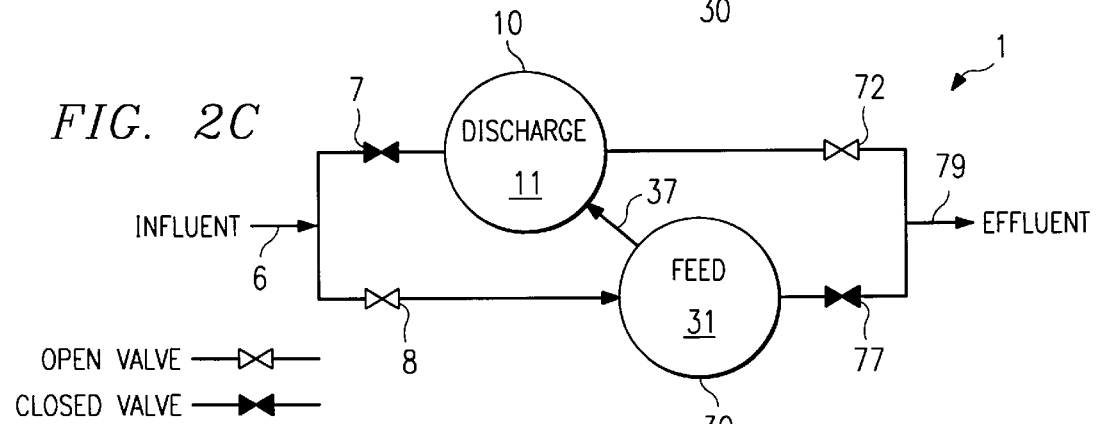
Figure 2D:
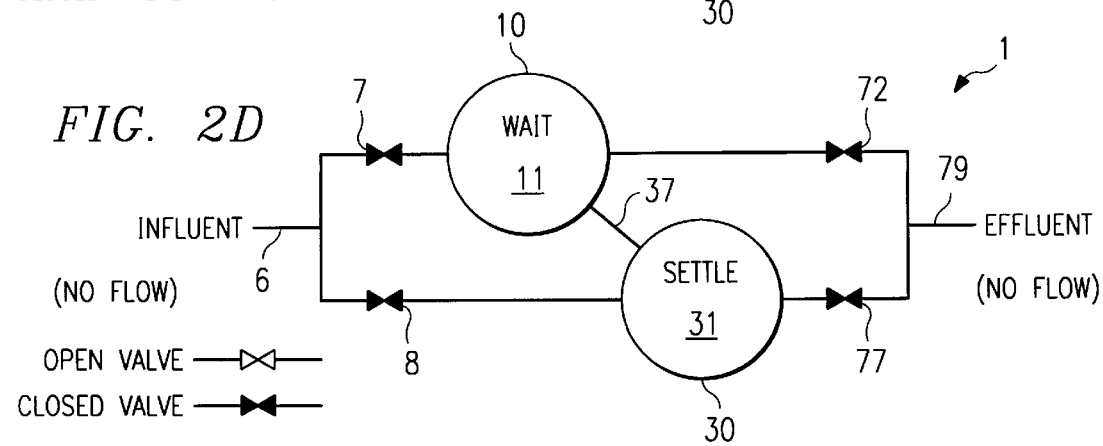

FIG. 2C and FIG. 2D illustrate the first-half and second-half of stage two for alternating anaerobic contact processing where the flows of wastewater and anaerobic liquor are reverse to those first shown by FIG. 2A and FIG. 2B. FIG. 2C represents the first-half of stage two of the process having valve 8 now open and valve 7 remaining closed. With this arrangement, vessel 30 receives the incoming wastewater feed and serves as the initial reacting vessel. Mixing system 40 mixes the contents 31 at a rate sufficient to maintain the anaerobic bacteria in suspension. The anaerobic bacteria of vessel 30 react and break down the organic components of the incoming wastewater feed. Gases produced during the reaction of the anaerobic bacteria with the organic materials in the contents 31—an anaerobic liquor—are removed from the vessel 30 and introduced into gas conduit 90. Mixing system 20 in vessel 10 is off, permitting solids and anaerobic bacteria of contents 11 to settle in vessel 10.

Turning again back to FIG. 1, a portion of contents 31 passes into the transfer manifold 35 at a rate based upon the rate of inflow of wastewater feed to vessel 30. The orifice size of the transfer manifolds 15 and 35, and the diameter of transfer conduit 37 are selected so as to promote the desired flow rate through conduit 37 between vessels 30 and 10. A portion of contents 31 continues to flow at such rate through transfer conduit 37 and into vessel 10 via transfer manifold 15. An amount of the portion of contents 31 when in conduit 37 flows into recycle conduit 38 and does not become part of contents 11. The contents 31 in conduit 38 flow into recycle system 80 and are eventually pumped back into conduit 6.

During the first-half of stage two, vessel 10 acts as the settling vessel for the contents 11, which at this point exists mainly as anaerobic liquor. The anaerobic bacteria along with any organic residual solids separate from contents 11 and settle within vessel 10, forming bi-layered contents 11. The top layer exists as treated wastewater while the bottom layer exists as a mixture of wastewater and biomass. As wastewater feed flows into vessel 30, a portion of the treated wastewater in vessel 10 passes into effluent manifold 71. The fluid within effluent manifold 71 passes through conduit 72, containing is open valve 73, and enters effluent conduit 79. The treated wastewater, which flows through conduit 72, has an organic concentration that is substantially less than the organic concentration of the wastewater fed into conduit 13. Effluent conduit 79 transports the treated waste to a municipal water system or storage (not shown).

FIG. 2D illustrates the second-half of stage two regarding the alternating contact process. Mixer 40 in vessel 30 is turned to the off position allowing solids and the anaerobic bacteria of contents 31 to settle within vessel 30. Mixer 20 in vessel 10 remains off. Valves 7, 8, 72 and 77 are closed thereby preventing any influx or efflux into either vessel 10 or 30. There is no flow within either vessel 10 or vessel 30 other than through transfer conduit 37. As gases are removed, preferably continuously, from both vessels 10 and 30, there is not any significant flow of fluid through conduit 37 during the stage represented by FIG. 2D. In contrast, there is a flow through conduit 37 which is at least substantially continuous and at least substantially equal to the flow rate of feed through conduit 6 during any period of time that either vessel 10 or vessel 30 is being employed to conduct the breakdown of organic material by the anaerobic bacteria. The duration of the stage illustrated in FIG. 2D can continue for a few hours or until a supernatant layer exists within the contents 31. Recycle conduit 38 continues to receive an amount of contents 31 flowing through conduit 37 but at a rate less than the rate occuring in the first-half of stage two. Waste sludge valve 85 of conduit 84 is opened if it has been determined that the sludge concentration within either or both of vessels 10 or 20 is outside the operational range.

The addition of another vessel or vessels to the apparatus 1 of FIG. 1 provides several advantages. For example, a three or more vesseled embodiment can increase the efficiency of the system by avoiding the delays associated with the settling steps illustrated in FIG. 2B and FIG. 2D. With a three or more vesseled embodiment, the contents of at least one vessel always remain finely settled thereby reducing the time required for fine-settlement in the two-vesseled embodiment.

ANOTHER PREFERRED EMBODIMENT

Figure 3:
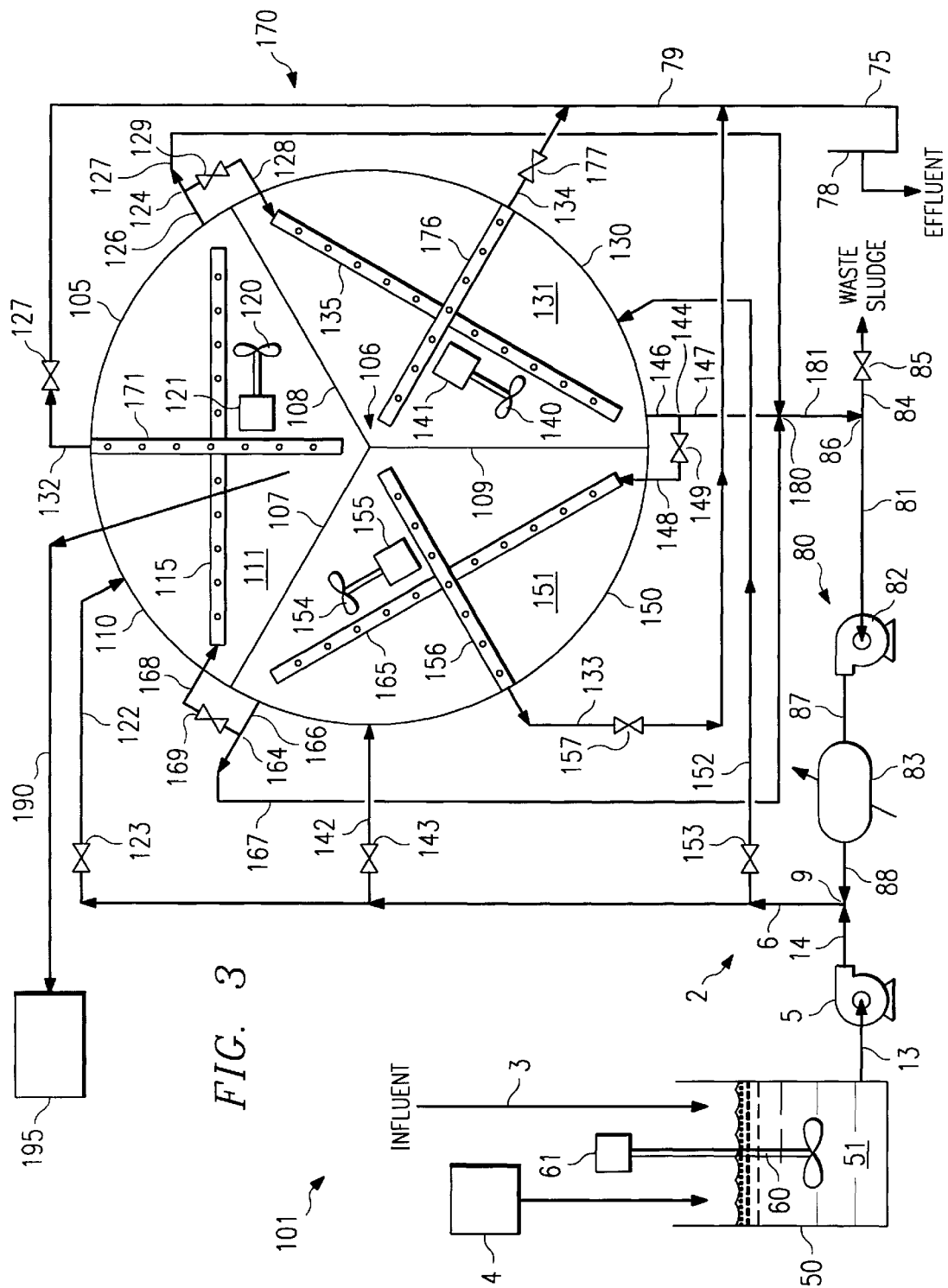
FIG. 3 is a schematical view of a multi-chambered vessel system utilizing an alternating anaerobic contact process.

The reference numeral 101 of FIG. 3 represents a second preferred embodiment of the invention described herein. In general, the apparatus of FIG. 3 includes an equalization vessel 50, a feed system 2, a multi-chambered vessel 105, an effluent system 170, and a recycle and waste sludge system 80. The type, use and arrangement of the equalization vessel, influent system, and recycle system are similar to those described above and illustrated in FIG. 1. Such structures, therefore, will be omitted from this section of the Detailed Description. Only multi-chambered vessel 105 and effluent system 170 are described as illustrated in FIG. 3.

Multi-chambered vessel 105 has a top-wall, bottom-wall and a continuous side-wall so to form an enclosure able to receive and contain wastewater. Multi-chambered vessel 105 includes internal region 106 and partition walls 107, 108 and 109. Partition walls 107, 108 and 109 extend from the side wall of multi-chambered vessel 105 and come into contact with each other at the center of internal region 106. Partition walls 107, 108, and 109, furthermore, span between the top and bottom of multi-chambered vessel 105. Such an arrangement forms reacting/settling chambers 110, 130 and 150. The multi-chambered vessel 105 as illustrated in FIG. 3 consists of three chambers. The multi-chambered apparatus as invented by the inventor; however, can exist as two or more chambers and is therefore not limited to the three-chambered vessel as illustrated in FIG. 3. For example, a two chambered embodiment exists if partition walls 108 and 109 are removed and partition wall 107 traverses vessel 105.

Turning back to FIG. 3, chambers 110, 130 and 150 form an enclosure able to receive wastewater feed and contain contents 111, 131 and 151. Contents 111, 131 and 151 exist mainly as a combination of wastewater and anaerobic bacteria. The anaerobic bacteria can either be naturally occurring or genetically engineered. Positioned in chambers 110, 130 and 150 are mixing systems 120, 140 and 154, respectively having motors 121, 141 and 155. Other embodiments for use as a mixing system include biogas and liquid recirculation. The top portion of each of chambers 110, 130 and 150 is flow connected to gas discharge conduit 190. The opposite end of conduit 190 flow connects into gas handling system 195. Near the bottoms of chambers 110, 130 and 150 respectively reside transfer manifolds 115, 135 and 165.

Transfer manifold 115 of chamber 110 flow connects to transfer/recycle conduit 126. Conduit 126 bifurcates at junction 124 and forms conduits 127 and 128. Conduit 127 flow connects to waste sludge conduit 84 at joint 180. Conduit 128, containing valve 129, flow connects to transfer manifold 135 of chamber 130. Transfer manifold 135 flow connects to transfer/recycle conduit 146. Transfer/recycle conduit 146 bifurcates at junction 144 and forms conduits 147 and 148. Conduit 147 flow connects to waste sludge conduit 84 at joint 180. Conduit 148, containing valve 149, flow connects to transfer manifold 165 of chamber 150. Transfer manifold 165 flow connects to transfer/recycle conduit 166. Conduit 166 bifurcates at junction 164 and forms conduits 167 and 168. Conduit 167 flow connects to waste sludge conduit 84 at joint 180. Conduit 168, containing valve 169, flow connects to transfer manifold 115 of chamber 110, thereby completing a continuous communication amongst each chamber.

Effluent system 170 includes effluent manifolds 171, 176, and 156. Effluent manifolds 171, 176, and 156, unlike transfer manifolds 115, 135, and 165, are not part of a continuous communication amongst each chamber. Effluent manifold 171 of chamber 110 flow connects to conduit 132. Conduit 132, containing effluent valve 127, flow connects to effluent conduit 79. Effluent manifold 176 of chamber 130 flow connects to conduit 134. Conduit 134, containing effluent valve 177, flow connects to effluent conduit 79. Effluent manifold 156 of chamber 150 flow connects to conduit 133. Conduit 133, containing valve 157, flow connects to effluent conduit 79. Effluent conduit 79 continues beyond apparatus 101 where effluent trap 75 flow connects to the conduit 79. An atmospheric vent 78 can be attached to the conduit 79 at any location downstream from the effluent trap 75.

In other preferred embodiments of the invention additional chambers can be formed and structured in a similar arrangement to that described above.

In use, the apparatus 101 of FIG. 3 and FIG. 4 operate essentially the same as apparatus 1 of FIG. 1 and FIG. 2 in that each chamber can function as a reactor and settler. Initiation of the process or system begins with the introduction of wastewater from conduit 3 into the equalization vessel 50. In vessel 50 the wastewater is mixed by mixing system 60 while concomitantly being treated by chemical addition system 4. After an appropriate period of time, the wastewater is pumped from the equalization vessel 50 and into conduit 6.

Figure 4A:
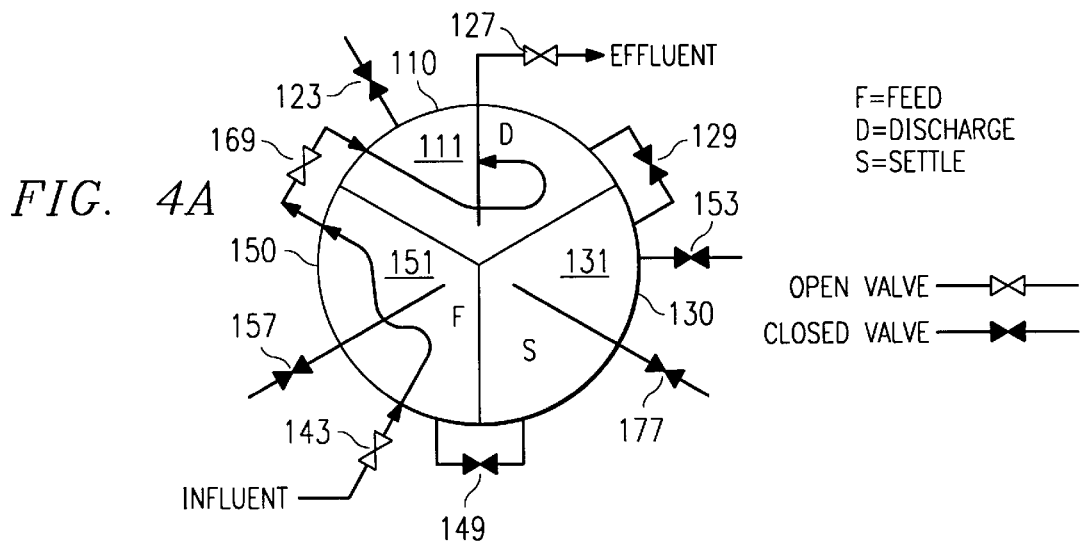
FIGS. 4A, 4B and 4C are flow schematic diagrams illustrating sequential stages of operation in a modified process when applying the multi-chambered vessel system illustrated in FIG. 3.
Figure 4B:
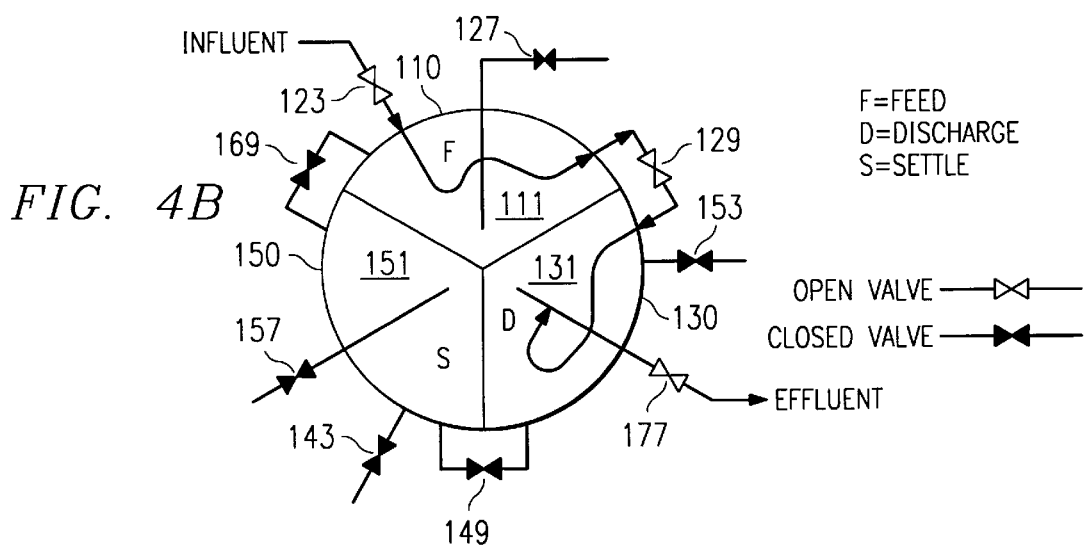
Figure 4C:
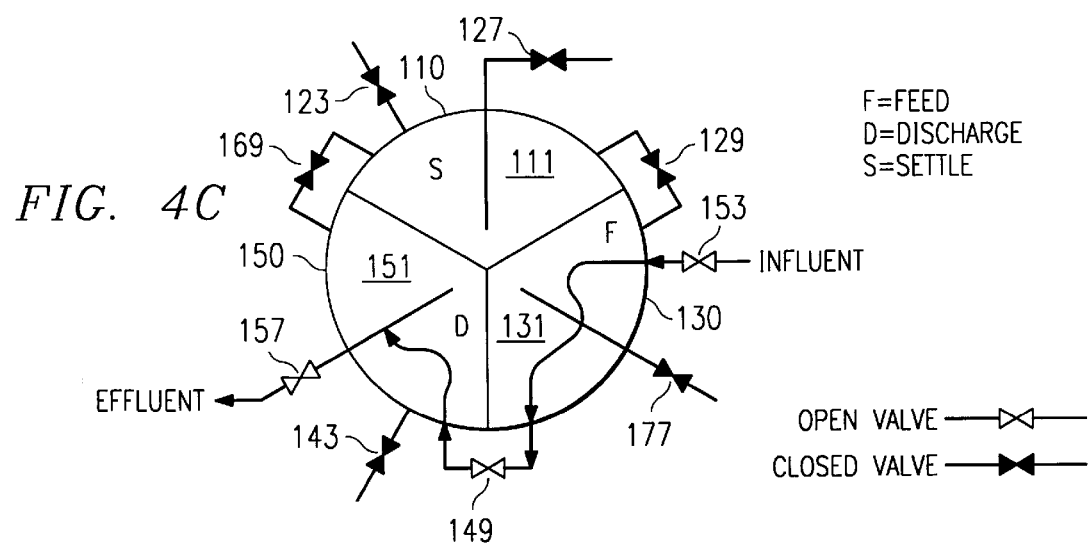

FIG. 4A, 4B and 4C provide a schemata demonstrating the feed, discharge, and settle stages of alternating anaerobic contact processing when performed in the multi-chambered vessel 105 as illustrated in FIG. 3. FIG. 4A, 4B and 4C, however, demonstrate only one of many possible arrangements or steps for performing alternating anaerobic processing in the multi-chambered vessel 105.

FIG. 4A illustrates valves 143, 169 and 127 open and valves 123, 129, 153, 177, 149 and 157 closed. With this arrangement, chamber 150 receives the incoming wastewater feed and thereby serves as the initial reacting chamber. Mixing system 154 mixes contents 151 at a rate sufficient to maintain the anaerobic bacteria in suspension without causing the bacteria to shear. The anaerobic bacteria within chamber 150 react and begin to break down the incoming waste. Gases produced during the reaction of the anaerobic bacteria with the organic materials in the contents 151 are removed from chamber 150 and introduced into gas conduit 190. Mixing systems 120 and 140 respectively of chambers 110 and 130 are off.

Looking back at FIG. 3, a portion of contents 151 passes into transfer manifold 165 at a rate based upon the inflow of wastewater feed into chamber 150. The orifice of the transfer manifolds 165 and 115, and the diameter of conduits 166 and 168 are selected so as to promote the desired flow rate through conduits 166 and 168. A portion of contents 151 continues at such rate through conduits 166 and 168 and open valve 169 where it eventually passes into chamber 110 via transfer manifold 115. An amount of the portion of contents 115 when in conduit 166 flows into conduit 167. The contents 115 in conduit 167 flow to conduit 181 and into recycle system 80, and are eventually pumped back into conduit 6.

In FIG. 4A, chamber 110 acts as the settling chamber for contents 111 and chamber 130 acts as the settling chamber for contents 131. The anaerobic bacteria along with any organic residual solids separate from the remainder of contents 111 and settle to the bottom of chamber 110, forming bi-layered contents 111. The bottom layer of contents 111 exists as a mixture of wastewater and biomass while the top layer exists as treated wastewater. As wastewater feed continues to be fed into chamber 150, fluid passes through conduits 166 and 168 causing a portion of the treated wastewater to pass through effluent manifold 171. The treated wastewater which passed through effluent manifold 171 passes through open valve 127 and enters effluent conduit 79. The treated wastewater, which flows through conduits 166, and 168 has an organic concentration that is substantially less than the organic concentration of the wastewater fed into conduit 13. Effluent conduit 79 can transport the treated waste to a municipal wastewater plant or storage (not shown).

FIG. 4B illustrates valves 123, 129 and 177 open and valves 127, 153, 149, 143, 157 and 169 closed. With this arrangement, chamber 110 receives the incoming wastewater feed and thereby serves as the reacting chamber. Mixing system 154 in chamber 150 is turned off, allowing the anaerobic bacteria and other solids in the contents 151 to settle for a time period until a supernatant layer exists in contents 151. Mixing system 140 of chamber 130 is off. Mixing system 120 of chamber 110 is turned on and set at a rate sufficient to maintain the anaerobic bacteria in suspension without causing the bacteria to shear. The anaerobic bacteria within chamber 110 react and begin to break-down the incoming waste. Gases produced during the reaction of the anaerobic bacteria with the organic materials in the contents 111 are removed from chamber 110 and introduced into gas conduit 190. The recycle system 80 continues to receive an amount of contents 115 but at a rate less than when valve 143 was open.

Returning to FIG. 3, a portion of contents 111 in chamber 110 passes into transfer manifold 115 at a rate based upon the inflow of wastewater feed into chamber 110. The orifice size of the transfer manifolds 115 and 135, and the diameter of transfer conduits 126 and 128 are selected so as to promote the desired flow rate through conduits 126 and 128. A portion of the contents 111 continues at such rate through conduits 126 and 128 and open valve 129 where it eventually passes into chamber 130 via transfer manifold 135. An amount of the portion of contents 111 when in conduit 126 flows into conduit 127. The contents 115 in conduit 127 flow to conduit 181 and into recycle system 80 and are eventually pumped back into conduit 6.

In FIG. 4B, chamber 130 acts as the settling chamber for contents 131 and chamber 150 acts as the settling chamber for contents 151. The anaerobic bacteria along with any residual organic solids separate from the remainder of contents 131 and settle to the bottom of chamber 130 forming bi-layered contents 131. The bottom layer of contents 131 exists as biomass while the top layer exists as treated wastewater. As wastewater feed continues to be fed into the chamber 110, fluid passes through conduits 126 and 128 and into chamber 130 causing a portion of the treated wastewater to pass through the effluent manifold 176. The treated wastewater which, passed through effluent manifold 176, passes through open valve 177 and enters effluent conduit 79. The treated wastewater, which flows through conduits 126, and 128 has an organic concentration that is substantially less than the organic concentration of the wastewater fed into conduit 13. Effluent conduit 79 can transport the treated waste to a municipal wastewater plant or storage (not shown).

FIG. 4C further illustrates the feed, discharge, and settle stages occurring within chambers 150, 110 and 130. Regarding FIG. 4C, valves 153, 149 and 157 are open while valves 177, 143, 169, 110, 127 and 129 are closed. Chamber 130, therefore, receives the incoming wastewater and acts as the reacting chamber. The mixing system 120 of chamber 110 is turned off allowing the anaerobic bacteria and other solids in the contents 111 to settle for a time period until a clear upper layer exists in contents 111. Mixing system 154 of chamber 150 is off. Mixing system 140 of chamber 130 is turned on and set at a rate sufficient enough to maintain the anaerobic bacteria in suspension without causing the bacteria to shear. The anaerobic bacteria within chamber 130 react and begin to breakdown the incoming waste. Gases produced during the reaction of the anaerobic bacteria with the organic materials in the contents 131 are removed from chamber 150 and introduced into gas conduit 190. The recycle system 80 continues to receive an amount of contents 115 but at a rate less than when valve 143 was open.

Again turning to FIG. 3, a portion of the contents 131 passes into the transfer manifold 135 at a rate based upon the inflow of wastewater into chamber 130. The orifice size of the transfer manifolds 135 and 165, and the diameter of transfer conduits 146 and 148 are selected so as to promote the desired flow rate through conduits 146 and 148 between chambers 150 and 110. A portion of contents 131 continues at such rate through conduits 146 and 148 and open valve 149 where it eventually passes into chamber 150 via transfer manifold 165. An amount of the portion of contents 131 within conduit 146 flows into conduit 147. The contents 131 in conduit 147 flow into conduit 181 and into recycle system 80, and are eventually pumped back into conduit 6.

In FIG. 4C, chamber 150 acts as the settling chamber for contents 151 and chamber 110 acts as the settling chamber for contents 111. The anaerobic bacteria along with any residual organic solids separate from the remainder of contents 151 and settle to the bottom of chamber 150 forming bi-layered contents 151. The bottom layer of contents 151 exists as biomass while the top layer exists as treated wastewater. As wastewater feed continues to be fed in chamber 130, fluid passes through conduits 146 and 148 and into chamber 150 causing a portion of the treated wastewater to pass through the effluent manifold 156. The treated wastewater which, passed through the effluent manifold 156, passes through open valve 157 and enters effluent conduit 79. The treated wastewater which flows through conduits 126, and 128 has an organic concentration that is substantially less than the organic concentration of the wastewater fed into conduit 13. Effluent conduit 79 can transport the treated wastewater to a municipal wastewater plant or storage (not shown). Waste sludge valve 85 of conduit 84 is opened if it has been determined that the sludge concentration within a particular chamber is outside the operational range.

The main advantage of the multi-chambered, single vessel embodiment (as illustrated in FIG. 3) over the multi-vesseled embodiment (as illustrated in FIG. 1) is that the overall cost for manufacturing the multi-chambered embodiment is significantly less than the overall cost for manufacturing the multi-vesseled embodiment because only one vessel is required.

EXAMPLE 1

A bench-scale, two-vesseled system (according to the general design of FIG. 1) was fabricated to test the efficacy of the alternating anaerobic contact system. Using two six-liter acrylic vessels, the system was seeded with anaerobic liquor from a municipal wastewater plant and fed daily with wastewater from a food-processing facility. The wastewater mainly originated from corn soaking and milling operations, with any large solids already removed by vibratory screens.

The hydraulic and organic loading rates of the bench-scale system were gradually increased over the six months it was in operation. The initial feed rate was one liter per day but was increased to three liters per day by the end of six months. This latter feed rate gave a retention time of four days and an organic loading rate of 2.0–2.5 g Chemical Oxygen Demand (COD)/liter-day. Influent and effluent samples were analyzed to measure the system's treatment efficiency and to evaluate its process stability.

Results demonstrated the Alternating Anaerobic Contact System to be very effective at removing conventional pollutants, as shown in Table 1. Moreover, the wastewater did not require further nutrients to achieve the tabulated results. Settleability of the bacteria from the anaerobic liquor was good even though the anaerobic liquor concentration averaged 13000–18000 mg/L Total Suspended Solids (TSS). The gas yield from the system approximated 320 mL/g COD, a value close to the theoretical maximum gas yield.

TABLE 1

| TEST PARAMETER | RAW WASTEWATER | TREATED WASTEWATER | REMOVAL EFFICIENCY |
|---|---|---|---|
| BOD | 2800 mg/L | 255 mg/L | 91.0% |
| TSS | 2895 mg/L | 460 mg/L | 84.0% |
| COD | 9220 mg/L | 1000 mg/L | 88.0% |
| pH | 9.5–11.5 | 6.4–6.8 | |

BOD = Biological Oxygen Demand
TSS = Total Suspended Solids
COD = Chemical Oxygen Demand

We claim:

1. A process for treating a wastewater feed using an alternating anaerobic contact process comprising the steps of:

(a) contacting a first portion of said wastewater feed with anaerobic bacteria in a first enclosed vessel to form a first anaerobic liquor, said first enclosed vessel serving as a reacting vessel for anaerobic bacteria to break-down organic material existing in said first portion of said wastewater feed;

(b) passing a portion of said first anaerobic liquor from said first enclosed vessel to a second enclosed vessel, said second enclosed vessel serving as a settling vessel;

(c) permitting anaerobic bacteria of said portion of said first anaerobic liquor in said second enclosed vessel to settle towards a bottom of said second enclosed vessel and treated wastewater to flow from said second enclosed vessel;

(d) allowing anaerobic bacteria in a remaining portion of said first anaerobic liquor in said first enclosed vessel to settle towards a bottom of said first enclosed vessel;

(e) contacting a second portion of said wastewater feed with anaerobic bacteria in said second enclosed vessel to form a second anaerobic liquor, said second enclosed vessel now serving as the reacting vessel for anaerobic bacteria to break-down organic material existing in said second portion of said wastewater feed;

(f) passing a portion of said second anaerobic liquor from said second enclosed vessel to said first enclosed vessel, said first enclosed vessel now serving as the settling vessel;

(g) permitting anaerobic bacteria in said portion of said second anaerobic liquor in said first enclosed vessel to settle towards the bottom of said first enclosed vessel and treated wastewater to flow from said first enclosed vessel;

(h) allowing anaerobic bacteria in a remaining portion of said second anaerobic liquor in said second enclosed vessel to settle towards the bottom of said second enclosed vessel.

2. A process according to claim 1, in which steps (a)–(h) are repeated.

3. A process according to claim 1, in which at least one additional enclosed vessel is flow connected to said first enclosed vessel and said second enclosed vessel by additional conduits to form a communication amongst said enclosed vessels.

4. A process according to claim 1, in which said first anaerobic liquor is mixed in said first enclosed vessel before passing said portion of said first anaerobic liquor to said second enclosed vessel.

5. A process according to claim 1, in which said second anaerobic liquor is mixed in said second enclosed vessel before passing said portion of said second anaerobic liquor to said first enclosed vessel.

6. A process according to claim 1, in which gases within said first enclosed vessel and said second enclosed vessel simultaneously flow from said first enclosed vessel and said second enclosed vessel to maintain consistent internal gas pressures within and between said first enclosed vessel and said second enclosed vessel.

7. A process for treating a wastewater feed using an alternating anaerobic contact process comprising the steps of:

(a) contacting a first portion of said wastewater feed with anaerobic bacteria in a first enclosed chamber to form a first anaerobic liquors, said first enclosed chamber serving as a reacting chamber for anaerobic bacteria to break-down organic material existing in said first portion of said wastewater feed;

(b) passing a portion of said first anaerobic liquor from said first enclosed chamber to a second enclosed chamber, said second enclosed chamber serving as a settling chamber;

(c) permitting anaerobic bacteria in said portion of said first anaerobic liquor in said second enclosed chamber to settle towards a bottom of said second enclosed chamber and treated wastewater to flow from said second enclosed chamber;

(d) allowing anaerobic bacteria in a remaining portion of said first anaerobic liquor in said first enclosed chamber to settle towards a bottom of said first enclosed chamber;

(e) contacting a second portion of said wastewater feed with anaerobic bacteria in said second enclosed chamber to form a second anaerobic liquor, said second enclosed chamber now serving as the reacting chamber for anaerobic bacteria to break-down organic material existing in said second portion of said wastewater feed;

(f) passing a portion of said second anaerobic liquor from said second enclosed chamber to said first enclosed chamber, said first enclosed chamber now serving as the settling chamber;

(g) permitting anaerobic bacteria in said portion of said second anaerobic liquor in said first enclosed chamber to settle towards the bottom of said first enclosed chamber and treated wastewater to flow from said first enclosed chamber;

(h) allowing anaerobic bacteria in a remaining portion of said second anaerobic liquor in said second enclosed chamber to settle towards the bottom of said second enclosed chamber.

8. A process according to claim 7, in which steps (a)–(h) are repeated.

9. A process according to claim 7, in which at least one additional enclosed chamber is flow connected to said first enclosed chamber and said second enclosed chamber by additional conduits to form a communication amongst said enclosed chambers.

10. A process according to claim 7, in which said first anaerobic liquor is mixed in said first enclosed chamber before passing said portion of said first anaerobic liquor to said second enclosed chamber.

11. A process according to claim 7, in which said second anaerobic liquor is mixed in said second enclosed chamber before passing said portion of said second anaerobic liquor to said first enclosed chamber.

12. A process according to claim 7, in which gases within said first enclosed chamber and said second enclosed chamber flow from said first enclosed chamber and said second enclosed chamber to maintain consistent internal gas pressures within and between said first enclosed chamber and said second enclosed chamber.

13. A process for treating a wastewater feed using an alternating anaerobic contact process comprising the steps of:

(a) flowing a first portion of said wastewater feed into a first enclosed vessel, said first enclosed vessel serving as a reacting vessel wherein said first portion of wastewater feed is mixed with anaerobic bacteria thereby forming a first anaerobic liquor, wherein anaerobic bacteria in said first anaerobic liquor break-down organic material existing in said first portion of said wastewater feed;

(b) passing a portion of said first anaerobic liquor from said first enclosed vessel to a second enclosed vessel, said second enclosed vessel serving as a settling vessel;

(c) permitting anaerobic bacteria of said portion of said first anaerobic liquor in said second enclosed vessel to settle towards a bottom of the second enclosed vessel and treated wastewater to flow from said second enclosed vessel;

(d) stopping the flow of said first portion of said wastewater feed into said first enclosed vessel while also stopping the mixing within said first enclosed vessel for a time period until anaerobic bacteria in the first anaerobic liquor remaining within said first enclosed vessel settle to a bottom of said first enclosed vessel, thereby forming a supernatant layer in said first enclosed vessel;

(e) flowing a second portion of said wastewater feed into said second enclosed vessel, said second enclosed vessel now serving as the reacting vessel wherein said second portion of wastewater feed is mixed with anaerobic bacteria to form a second anaerobic liquor, wherein anaerobic bacteria in said second anaerobic liquor break-down organic material existing in said second portion of said wastewater feed;

(f) passing a portion of said second anaerobic liquor from said second enclosed vessel to said first enclosed vessel, said first enclosed vessel now serving as a settling vessel;

(g) permitting anaerobic bacteria in said portion of said second anaerobic liquor to settle towards the bottom of said first enclosed vessel and treated wastewater to flow from said first enclosed vessel;

(h) stopping the flow of said second portion of said wastewater feed into said second enclosed vessel while also stopping the mixing within said second enclosed vessel for a time period until anaerobic bacteria in the second anaerobic liquor remaining within said second enclosed vessel settle to the bottom of said second enclosed vessel, thereby forming a supernatant layer in said second enclosed vessel.

14. A process according to claim 13, in which steps (a)–(h) are repeated.

15. A process according to claim 13, in which at least one additional enclosed vessel is flow connected to said first enclosed vessel and said second enclosed vessel by additional conduits to form a communication amongst said enclosed vessels.

16. A process according to claim 13, in which said wastewater feed is first introduced into an equalization vessel wherein said wastewater feed is mixed and exposed to chemical additives for initial assistance in the process.

17. A process according to claim 13, in which gases within said first enclosed vessel and said second enclosed vessel flow from said first enclosed vessel and said second enclosed vessel to maintain consistent internal gas pressures within and between said first enclosed vessel and said second enclosed vessel.

18. A process for treating a wastewater feed using an alternating anaerobic contact process comprising the steps of:
  (a) flowing a first portion of said wastewater feed into a first enclosed chamber, said first enclosed chamber serving as a reacting chamber wherein said first portion of wastewater feed is mixed with anaerobic bacteria thereby forming a first anaerobic liquor, wherein anaerobic bacteria in said first anaerobic liquor breakdown organic material existing in said first portion of said wastewater feed;
  (b) passing a portion of said first anaerobic liquor from said first enclosed chamber to a second enclosed chamber, said second enclosed chamber serving as a settling chamber;
  (c) permitting anaerobic bacteria in said portion of said first anaerobic liquor in said second enclosed chamber to settle towards a bottom of said second enclosed chamber and treated wastewater to flow from said second enclosed chamber;
  (d) stopping the flow of said first portion of said wastewater feed into said first enclosed chamber while also stopping the mixing within said first enclosed chamber for a time period until anaerobic bacteria in the first anaerobic liquor remaining within said first enclosed chamber settle to a bottom of said first enclosed chamber, thereby forming a supernatant layer in said first enclosed chamber;
  (e) flowing a second portion of said wastewater feed into said second enclosed chamber, said second enclosed chamber now serving as the reacting chamber wherein said second portion of wastewater feed is mixed with anaerobic bacteria to form a second anaerobic liquor, wherein anaerobic bacteria in said second anaerobic liquor break-down organic material existing in said second portion of said wastewater feed;
  (f) passing a portion of said second anaerobic liquor from said second enclosed chamber to said first enclosed chamber, said first enclosed chamber now serving as a settling chamber;
  (g) permitting anaerobic bacteria in said portion of said second anaerobic liquor to settle towards the bottom of said first enclosed chamber and treated wastewater to flow from said first enclosed chamber;
  (h) stopping the flow of said second portion of said wastewater feed into said second enclosed chamber while also stopping the mixing within said second enclosed chamber for a time period until anaerobic bacteria in the second anaerobic liquor remaining within said second enclosed chamber settle to the bottom of said second enclosed chamber thereby forming a supernatant layer in said second enclosed chamber.

19. A process according to claim 18, in which at least one additional chamber is flow connected to said first enclosed chamber and said second enclosed chamber by additional conduits so to form a communication amongst each said chamber.

20. A process according to claim 18, in which steps (a)–(h) are repeated.

21. A process according to claim 18, in which said wastewater feed is first introduced into an equalization vessel wherein said wastewater is mixed and exposed to chemical additives for initial assistance in the process.

22. A process according to claim 18, in which gases within said first enclosed chamber and said second enclosed chamber flow from said first enclosed chamber and said second enclosed chamber to maintain consistent internal gas pressures within and between said first enclosed chamber and said second enclosed chamber.

23. A process for treating a wastewater feed comprising the steps of:
  (a) contacting said wastewater feed with anaerobic bacteria in a first enclosed vessel to form an anaerobic liquor, said first enclosed vessel serving as a reacting vessel;
  (b) passing continuously a portion of said anaerobic liquor from said first enclosed vessel to a second enclosed vessel, said second enclosed vessel serving as a settling vessel;
  (c) allowing any gas formed within said first enclosed vessel and said second enclosed vessel to bleed-off simultaneously with the contacting of said wastewater feed with anaerobic bacteria in said first enclosed vessel and the continuous passing of said portion of said anaerobic liquor from said first enclosed vessel to said second enclosed vessel to maintain consistent internal gas pressures within and between said first enclosed vessel and said second enclosed vessel; and
  (d) permitting anaerobic bacteria of said anaerobic liquor in said second enclosed vessel to settle within said second enclosed vessel and treated wastewater to flow from said second enclosed vessel.

24. A process for treating a wastewater feed comprising the steps of:
  (a) contacting said wastewater feed with anaerobic bacteria in a first enclosed chamber to form an anaerobic liquor, said first enclosed chamber serving as a reacting chamber;
  (b) passing continuously a portion of said anaerobic liquor from said first enclosed chamber to a second enclosed chamber, said second enclosed chamber serving as a settling chamber;
  (c) allowing any gas formed within said first enclosed chamber and said second enclosed chamber to bleed-off simultaneously to the contacting of said wastewater feed with anaerobic bacteria in said first enclosed chamber and the continuous passing of said portion of said anaerobic liquor from said first enclosed chamber to said second enclosed chamber to maintain consistent internal gas pressures within and between said first enclosed chamber and said second enclosed chamber; and (d) permitting anaerobic bacteria of said anaerobic liquor within said second enclosed chamber to settle within said second enclosed chamber and treated wastewater to flow from said second enclosed chamber.

* * * * *